(12) United States Patent
Plaza et al.

(10) Patent No.: US 9,420,163 B2
(45) Date of Patent: Aug. 16, 2016

(54) HYBRID AUTO-FOCUS MECHANISM

(71) Applicants: STMicroelectronics (Grenoble 2) SAS, Grenoble (FR); STMicroelectronics (Research & Development) Limited, Marlow, Buckinghamshire (GB); STMicroelectronics Asia Pacific Pte Ltd, Singapore (SG)

(72) Inventors: Laurent Plaza, Grenoble (FR); Olivier Lemarchand, Grenoble (FR); Paul Varillon, Grenoble (FR); Francesco Cascio, Grenoble (FR); Duncan Hall, Edinburgh (GB); Sam Lee, Edinburgh (GB)

(73) Assignees: STMicroelectronics (Grenoble 2) SAS, Grenoble (FR); STMicroelectronics (Research & Development) Limited, Marlow (GB); STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 14/842,238

(22) Filed: Sep. 1, 2015

(65) Prior Publication Data
US 2016/0182809 A1    Jun. 23, 2016

(30) Foreign Application Priority Data

Dec. 23, 2014 (FR) ...................... 14 63242

(51) Int. Cl.
| | |
|---|---|
| *H04N 5/232* | (2006.01) |
| *G02B 7/28* | (2006.01) |
| *H04N 5/225* | (2006.01) |
| *H04N 5/235* | (2006.01) |
| *H04N 9/04* | (2006.01) |

(52) U.S. Cl.
CPC .............. *H04N 5/23212* (2013.01); *G02B 7/28* (2013.01); *H04N 5/2257* (2013.01); *H04N 5/2351* (2013.01); *H04N 9/045* (2013.01)

(58) Field of Classification Search
CPC ............................. H04N 5/23212; G02B 7/28
USPC .......................................................... 396/104
See application file for complete search history.

(56) References Cited

U.S. PATENT DOCUMENTS

| | | | |
|---|---|---|---|
| 2003/0043290 A1* | 3/2003 | Sasaki ................ | H04N 5/23212 348/345 |
| 2005/0052563 A1 | 3/2005 | Yasuda | |
| 2015/0249783 A1* | 9/2015 | Zheng ................ | H04N 5/23212 348/349 |

FOREIGN PATENT DOCUMENTS

| | | | |
|---|---|---|---|
| EP | 1713260 A2 | | 10/2006 |
| JP | 03212632 A | * | 9/1991 |
| JP | 09005611 A | * | 1/1997 |
| JP | 09005617 A | * | 1/1997 |
| JP | 2000098217 A | | 4/2000 |
| JP | 2001343578 A | | 12/2001 |

OTHER PUBLICATIONS

INPI Search Report and Written Opinion for FR 1463242 dated Nov. 13, 2015 (8 pages).

* cited by examiner

*Primary Examiner* — Chris Mahoney
(74) *Attorney, Agent, or Firm* — Gardere Wynne Sewell LLP

(57) ABSTRACT

An autofocus method determines that a ranging device of a digital camera has failed in an attempt to provide a distance estimation. The ranging device provides one or more parameters indicating conditions related to the failure of the ranging device to provide the distance estimation. An autofocus sequence based on the one or more parameters is then performed.

18 Claims, 3 Drawing Sheets

HYBRID AUTO-FOCUS MECHANISM

PRIORITY CLAIM

This application claims priority from French Application for Patent No. 1463242 filed Dec. 23, 2014, the disclosure of which is incorporated by reference.

TECHNICAL FIELD

The present disclosure relates to the field of systems and methods for autofocusing, and in particular to a system and method of autofocusing using a ranging device.

BACKGROUND

It has become standard in recent years to equip most types of mobile devices, such as mobile telephones, with cameras for capturing still images and/or video. Due to a demand for high quality images, the cameras are becoming more sophisticated and generally comprise a lens system with an autofocus mechanism to automatically perform a focusing operation.

Among existing autofocus mechanisms, some are termed "passive" autofocus systems, which generally involve processing images captured by the image sensor to detect when focusing has been achieved, for example by performing contrast or phase detection. Other autofocus mechanisms, termed "active" autofocus systems, rely on a dedicated ranging device to estimate the distance to an object in the image scene, allowing a rapid convergence to an appropriate lens position.

A drawback with passive autofocus mechanisms is that they tend to be relatively slow in providing the optimum lens position. However, while it would be desirable to rely solely on an active autofocus mechanism, in certain cases the ranging device is unable to provide a distance reading.

Hybrid autofocus systems use a combination of passive and active autofocus methods. If the active autofocus mechanism fails, the passive autofocus sequence is triggered to provide the autofocus function. Therefore, while such a hybrid system can provide a shorter focusing time using the active autofocus method, in the case that this method fails, focusing is still likely to be slow.

There is thus a need in the art for an autofocus method and system permitting faster focusing.

SUMMARY

It is an aim of embodiments of the present description to at least partially address one or more needs in the prior art.

According to one aspect, there is provided an autofocus method comprising: determining, by a processing device of a digital camera having a ranging device, that the ranging device failed in an attempt to provide a distance estimation; receiving by the processing device from the ranging device one or more parameters indicating conditions related to the failure of the ranging device to provide the distance estimation; and performing, by the processing device, an autofocus sequence based on the one or more parameters.

According to one embodiment, the one or more parameters comprise one or more of: an error code from the ranging device; and a distance value representing an estimation of the maximum distance for which the ranging device is capable of determining a distance estimation.

According to one embodiment, the digital camera comprises at least one lens controllable to have N unique focusing positions, and based on the one or more parameters, the autofocus sequence comprises an iterative search covering a subset of the N unique focusing positions, an initial lens position of the autofocus sequence being selected based on the one or more parameters.

According to one embodiment, the digital camera comprises an image sensor on which the at least one lens forms an image of an image scene, the method further comprising: processing, by the processing device, images captured by the image sensor to determine focus measures; and performing the iterative autofocus search based on the focus measures.

According to one embodiment, the one or more parameters comprise a distance value representing an estimation of the maximum distance for which the ranging device is capable of determining a distance estimation.

According to one embodiment, the distance value is determined based on an ambient light measure.

According to one embodiment, the autofocus further comprises estimating a reflectance of a target object of the autofocus method, and determining the distance value based also on the estimated reflectance of the target object.

According to one embodiment, estimating the reflectance of the target comprises detecting a color of the target object.

According to one embodiment, the processing device is adapted to: compare the distance value with a first distance threshold, and if the distance value is higher than the first distance threshold, performing the autofocus operation comprises selecting a lens position corresponding to infinity.

According to one embodiment, the first distance threshold is a distance corresponding to less than one lens position from the infinity lens position.

According to one embodiment, the processing device is adapted to: compare the distance value with a second distance threshold, and if the distance value is higher than the second distance threshold, performing the autofocus operation comprises performing an iterative autofocus operation with fine steps for a range of lens positions corresponding to distances in the range Dmax to infinity.

According to one embodiment, the second distance threshold is equal to a focusing distance corresponding to six or less lens positions from the lens position corresponding to infinity.

According to a further aspect, there is provided an autofocus system comprising: a digital camera comprising at least one lens controllable to have N unique focusing positions; a ranging device adapted to estimate a distance to an object; and a processing device adapted to: determine that the ranging device failed in an attempt to provide a distance estimation; receive from the ranging device one or more parameters indicating conditions related to the failure of the ranging device to provide the distance estimation; and perform an autofocus operation based on the one or more parameters.

According to one embodiment, the processing device is adapted to perform the autofocus operation by performing an iterative search covering a subset starting at a lens position selected based on the one or more parameters.

According to one embodiment, the digital camera comprises an image sensor on which the at least one lens forms an image of an image scene, and the processing device is adapted to process images captured by the image sensor to determine focus measures and to perform the iterative autofocus search based on the focus measures.

According to one embodiment, the autofocus system further comprises a memory storing a table indicating a mapping between distances in the image scene and corresponding lens positions of the at least one lens for focusing at said distances.

According to one embodiment, the one or more parameters comprise a distance value representing an estimation of the maximum distance for which the ranging device is capable of determining a distance estimation, and the ranging device is adapted to generate the distance value based on an ambient light measure.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
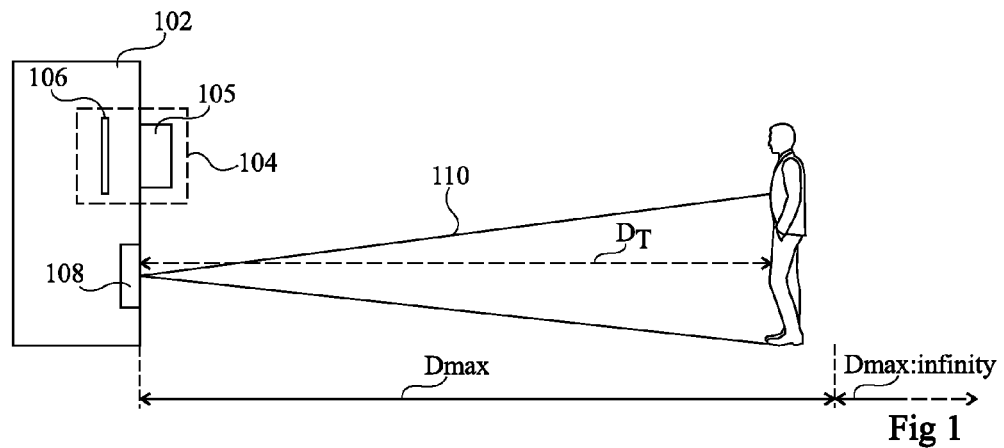
FIG. 1 schematically illustrates an image capture device having a ranging device according to an embodiment of the present disclosure.

FIG. 1 schematically illustrates an image capture device 102. The device 102 is for example a digital camera, or another portable electronics device equipped with a digital camera. For example, the device 102 is a mobile telephone, laptop or tablet computer, portable media players, or the like. The device 102 comprises a camera unit 104, for example comprising a lens unit 105, and an image sensor 106 on which the lens unit 105 is adapted to form an image of the image scene.

The image capture device 102 also comprises a ranging device 108. The ranging device 108 is for example adapted to estimate the distance D to a target object, which is for example the closest object detected in the image scene. The ranging device 108 operates by transmitting a signal, as represented by a beam 110 in FIG. 1, and by detecting reflections from the image scene. In the example of FIG. 1, the target object is a person located at a distance $D_T$ from the image capturing device 102.

The ranging device 108 may use any of a range of technologies for estimating the distance to an object. For example, in some embodiments, the ranging device transmits light, such as infrared light, and comprises a light sensitive cell for detecting photons returning from the image scene. For example, the distance is estimated by calculating the time of flight of these photons. Alternatively, other technologies could be used, such as ultrasound or capacitive sensing.

Whatever the type of ranging device 108, there is a maximum object distance, referred to herein as Dmax, above which the ranging device is not capable of estimating the distance. In the example of FIG. 1, Dmax is shown as being a little further from the camera than the distance $D_T$, and is for example in the range 0.5 to 2 m. If the closest object in the field of view of the ranging device 108 is at a distance greater than Dmax, the ranging device 108 will not be capable of detecting the presence of this object and estimating the distance to this object. As will be described in more detail below, a hybrid autofocus solution is for example adopted to use both a ranging device and a passive autofocus technique. In the case that the ranging device 108 attempts to capture a distance reading but fails, the passive autofocus technique is employed. Furthermore, in such a case the ranging device 108 is for example capable of generating error codes and/or of calculating an estimation of Dmax based on at least the ambient light levels.

Figure 2:
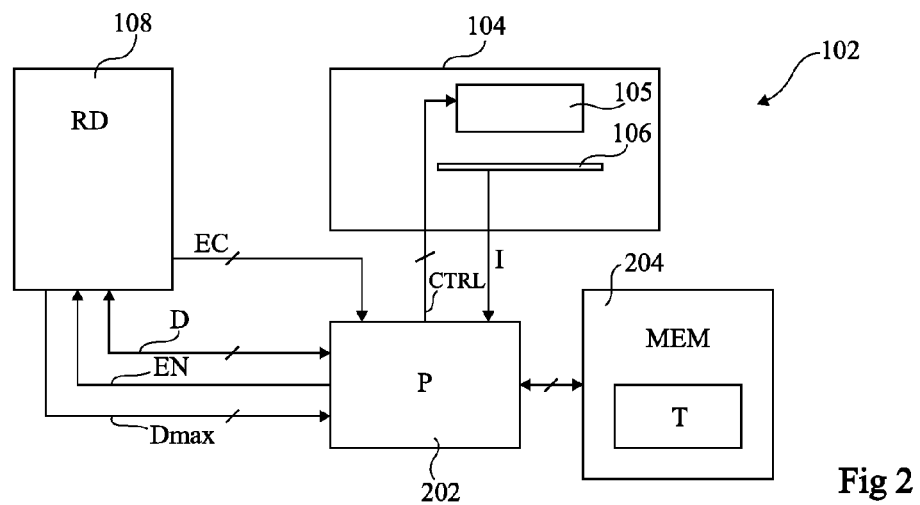
FIG. 2 schematically illustrates the image capture device of FIG. 1 in more detail according to an embodiment of the present disclosure.

FIG. 2 schematically illustrates the image capture device 102 of FIG. 1 in more detail according to an example embodiment. As illustrated, the device 102 for example comprises a processing device (P) 202, which for example comprises one or more processors under control of software instructions stored in a memory (MEM) 204. The processing device 202 may alternatively be at least partially implemented in hardware, such as by an ASIC (application specific integrated circuit).

The processing device 202 is coupled to the ranging device (RD) 108, for example via a suitable interface such as a parallel or serial bus. For example, the processing device 202 provides an enable signal EN to the ranging device 108 when a distance measurement is required, and the distance measurement D is provided by the ranging device 108 back to the processing device 202, for example in the form of an 8-bit distance value. Alternatively, if the attempt by the ranging device 108 to make a distance measurement fails, an estimation of the distance Dmax is for example generated by the ranging device 108 and provided to the processing device 202. Additionally or alternatively, one or more error codes (EC) may be provided by the ranging device 108 indicating conditions relating to the failure of the ranging device 108 to provide the distance estimation.

The processing device 202 for example provides a control signal CTRL to the lens unit 105 for controlling the position of at least one lens, and thus controlling the focus of the camera. For example, in some embodiments, the lens unit 105 comprises a VCM (voice coil motor—not illustrated) for positioning at least one lens of the lens unit 105, and a control module (also not illustrated) is provided in the lens unit 105 for converting the digital control signal CTRL into an analog voltage level for driving the VCM. Alternatively, the lens unit 105 could comprise other types of mechanisms for adjusting the focus of the camera 104, such as a stepper motor. In any case, the control signal CTRL for example comprises one of N values for controlling at least one lens of the lens unit to have one of N unique positions, providing N unique focusing positions.

The image sensor 106 of the camera 104 for example provides an image I to the processing device 202 for processing. For example, the processing device 202 performs a hybrid autofocusing sequence in which the ranging device 108 is used by preference, but if a valid distance reading cannot be obtained, an iterative autofocus search is performed by processing one or more images I captured by the image sensor 106 to determine when a focused image has been obtained.

Figure 3:
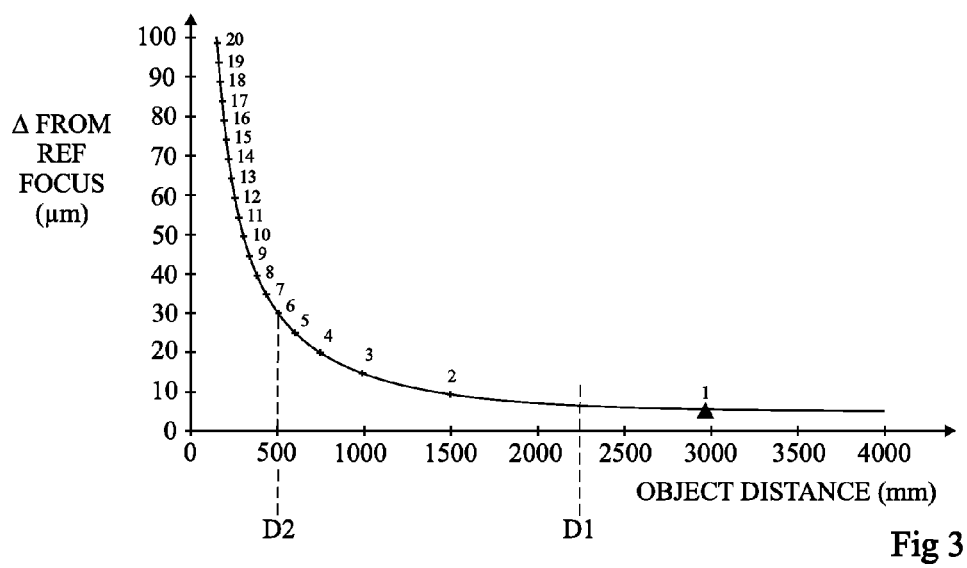
FIG. 3 is a graph representing a mapping between lens positions and object distances according to an embodiment of the present disclosure.

FIG. 3 is a graph representing an example of the position of a focusing lens of the lens unit 105, expressed as the distance from a reference focus position, for a range of object distances. In particular, for each lens position, there will be a focused distance range for which an object positioned in this range will be considered to be focused on the image sensor. One example of a curve is shown in FIG. 3, corresponding to a specific camera. Indeed, the shape of the curve will depend on the particular camera system, and in particular on aspects such as the number of pixels, the pixel size, the field of view and the lens F number. In the example of FIG. 3, a first lens position, labeled 1, corresponds to a focused distance of 3 m, and is for example a hyperfocal distance suitable for any object distance between 2.25 m and infinity. A second lens position for example corresponds to an object distance of 1.5 m, a third lens position to an object distance of 1 m, a fourth lens position to an object distance of 0.75 m, etc.

The object distance range for each lens position is for example stored in a lookup table T stored in the memory 204 of the image capture device 102. The lens positions are for example calibrated for a given device by positing an object at each of the distances, and adjusting the lens positioning until focusing has been achieved. Thus the lookup table T allows a distance detected by the ranging device 108 to be converted directly into an appropriate lens position.

The memory 204 also for example stores distances D1 and D2, which will be described in more detail below. The distance D1 for example corresponds to the object distance above which the first lens position is to be used, and is for example around halfway between the first and second lens positions, and is for example equal to 2.25 m in the example of FIG. 3. The distance D2 is for example the object distance to be used for the sixth lens position, counting from the hyperfocal lens position. Indeed, as will be described in more detail below, there are at least six lens movements in a typical HCS (Hill Climbing Search) autofocus sequence, three for a coarse search, and three for a fine search. Therefore, by choosing the distance D2 such that there are only six remaining potential lens positions, using only a fine autofocus search based on these remaining lens positions will always be equal to or faster than performing a full coarse and fine HCS autofocus sequence. In alternative embodiments, a different choice of the distance D2 would be possible, for example if a different type of search algorithm is employed.

Figure 4:
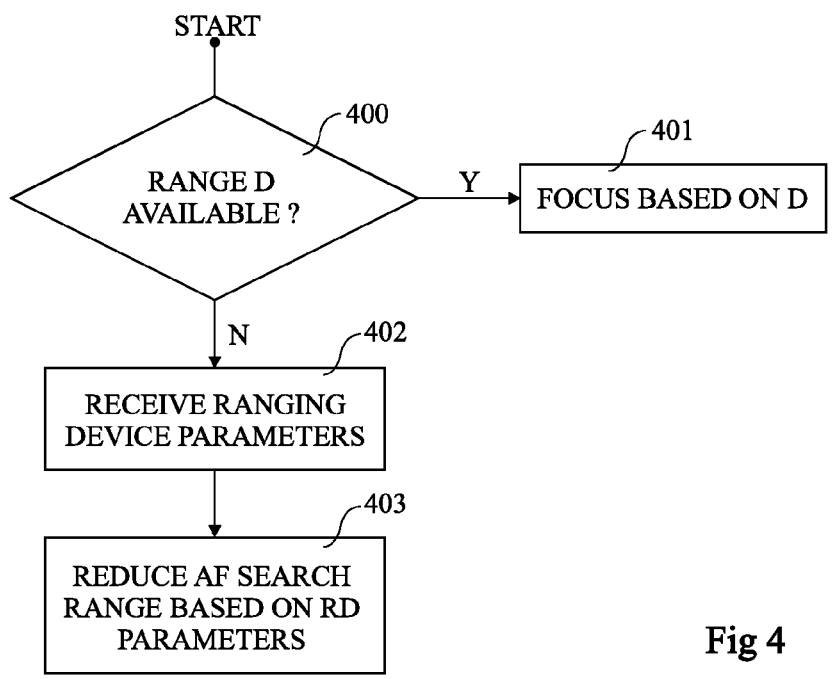
FIG. 4 is a flow diagram illustrating operations in an autofocus method according to an embodiment of the present disclosure.

FIG. 4 is a flow diagram illustrating an example of operations in an autofocusing method according to an example embodiment. These operations are for example performed by the processing device 202 during an autofocusing sequence, and following a command by the processing device 202 to the ranging device 108 to provide a distance estimation. For example, a user has pressed a button or a touch screen of the image capture device 102 to indicate that they wish to capture a still image or a video sequence, and the autofocusing sequence is launched.

From a start point (START), in an operation 400, it is determined whether the ranging device 108 has successfully estimated the distance D to an object in its field of view. If so, in an operation 401, focusing is performed based on this distance. For example, the distance D is converted, using the lookup table T stored in the memory 204, into the control signal CRTL corresponding to an appropriate lens position, and the control signal is applied to the lens unit 105. In some embodiments, a fine autofocus search algorithm may additionally be applied, as described in more detail below. Alternatively, if in operation 400 it is determined that the ranging device 108 failed to estimate a distance to any object, the next operation is 402.

In operation 402, the processing device 202 receives, from the ranging device 108, one or more parameters indicating conditions related to the failure of the ranging device 108 to provide the distance estimation. For example, the ranging device 108 receives one or more error codes EC and/or the distance Dmax.

After operation 402, in an operation 403, an autofocus operation is performed by the processing device 202 based on the one or more parameters received from the ranging device 108. For example, in some embodiments, this may involve performing an iterative autofocus search based on the value of Dmax, or bringing the lens position directly to the hyperfocal position.

Figure 5:
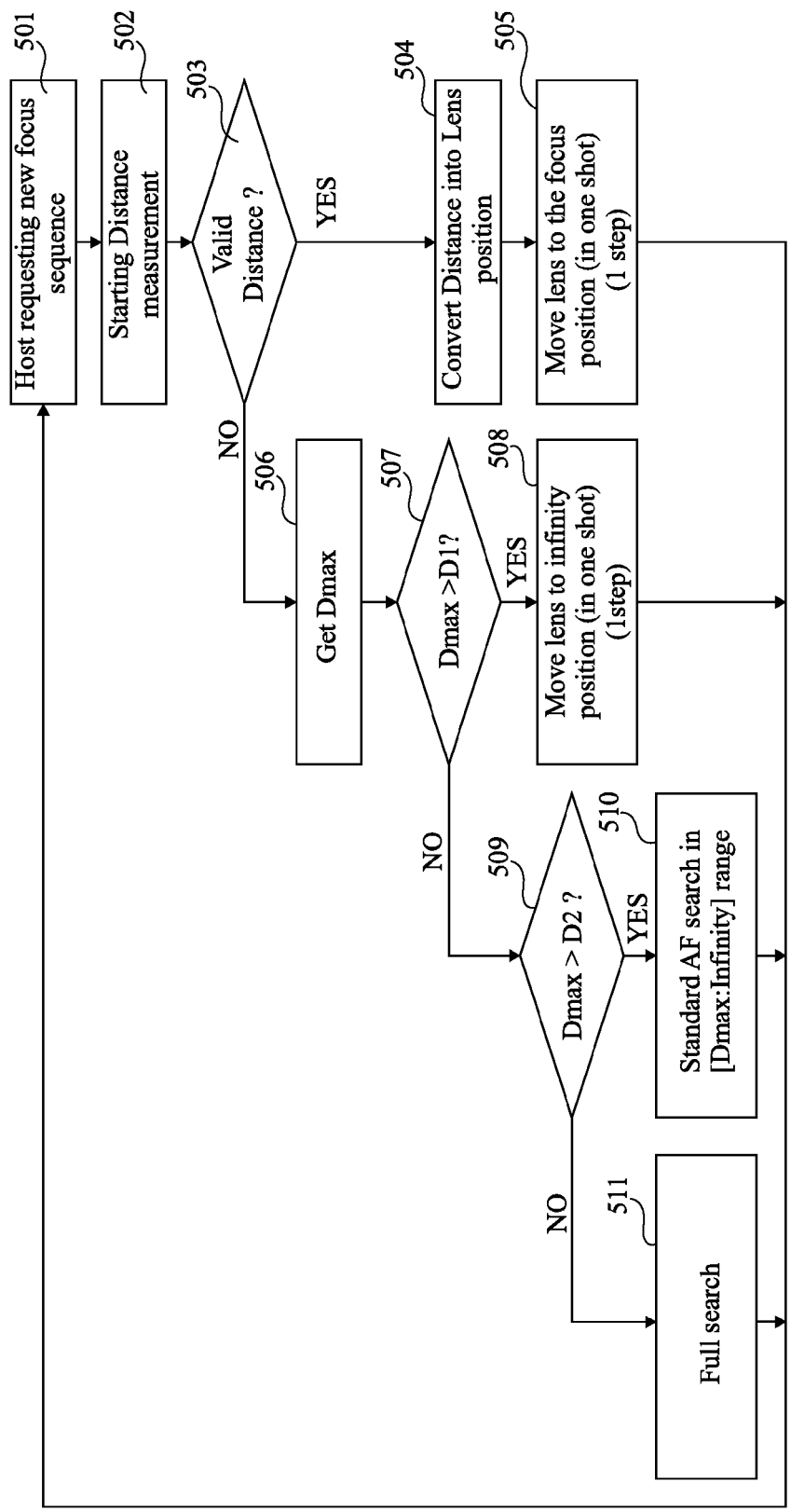
FIG. 5 is a flow diagram illustrating operations in an autofocus method in more detail according to an embodiment of the present disclosure.

FIG. 5 illustrates an autofocusing sequence in more detail based on the estimation Dmax provided by the ranging device 108.

In an operation 501, the host, which is for example the processing device 202, requests a new autofocus sequence.

After operation 501, in an operation 502, the distance measurement to be performed by the ranging device is initiated, for example by asserting the enable signal EN shown in FIG. 2.

After operation 502, in an operation 503, it is determined whether or not a valid distance has been obtained from the ranging device 108, or whether the distance estimation failed.

In the case that a valid distance was obtained in operation 503, in a next operation 504 this distance is converted into a lens position, and then in an operation 505, the lens is moved to the focus position, for example in one shot, followed optionally by a further fine search.

Alternatively, in the case that no valid distance was obtained in operation 503, the next operation is 506, in which the distance Dmax is obtained from the ranging device 108. For example, in the case that the ranging device 108 performed distance estimation based on the transmission and detection of light, Dmax is for example calculated by the ranging device 108 based on an ambient light level. In the case of other forms of transmission such as ultrasound, Dmax is for example estimated based on the ambient levels of this transmission frequency. Indeed, high ambient levels at wavelengths interfering with the transmission wavelength are likely to add noise and reduce the performance of the ranging device 108, thereby reducing Dmax. The ranging device 108 may measure the ambient light by detecting the amount of light received by its photosensitive cell when no light is emitted.

In some embodiments, the value Dmax is estimated assuming a specific reflectance of the target, for example equal to 17% grey. In some cases, the value of Dmax may be adjusted based on an estimation of the actual color and thus the actual reflectance of the target object, for example by evaluating pixel values close to the center of a captured image. Thus, for example, if the color is white, reflectance may be assumed to be at around 88%, whereas if the color is black, reflectance may be assumed to be only 5%.

In one embodiment, Dmax is calculated based on the following equation:

$$Dmax = \sqrt{\frac{RetSignalAt0mm \times \left(1 - \frac{RetAmbient}{MaxAmbientRate}\right)}{MinSignalNeeded}}$$

where RetAmbient is the ambient light level, for example measured by the ranging device 108, MaxAmbientRate is a maximum level of light before the ranging device 108 is saturated and/or blinded, RetSignalAt0 mm is an estimation of the return signal rate when a target is placed at 0 mm, and MinSignalNeeded is the minimum signal rate for obtaining a valid distance.

For example, RetSignalAt0 mm is determined based on the following equation:

RetSignalAt0 mm=ReturnRate×DistanceCalibration$^2$ where ReturnRate is the return signal rate calibration value, with a target at the calibration distance DistanceCalibration.

MinSignalNeeded is for example determined based on the following equation:

$$MinSignalNeeded = \frac{ThresholdLimit}{MaxConvTime \times 1000}$$

where ThresholdLimit is the minimum number of events, in other words photon detections, for obtaining a valid distance, expressed in Mcps (mega photon counts per second), and MaxConvTime is the maximum convergence time in ms for providing a distance measurement.

Referring again to FIG. 5, after operation 506, an operation 507 is performed in which Dmax is for example compared to the distance D1. If Dmax is greater than D1, then in a next operation 508, the lens is for example moved to the infinity position, for example corresponding to the hyperfocal distance. This is for example performed in one shot.

Alternatively, if in operation 507 Dmax is found to be lower than D1, the next operation is 509.

In operation 509, Dmax is compared to a value D2. If Dmax is greater than D2, in a next operation 510, a fine HCS autofocus search is for example performed over a reduced range of lens positions. For example, the search is performed between Dmax and infinity. Due to the choice of D2 as described above in relation to FIG. 3, the search for example takes six steps or fewer. However, in other embodiments, other types of search sequence could be implemented over the reduced range of lens positions. If in operation 509 Dmax is not found to be greater than D2, the next operation is 511.

In operation 511, a full iterative autofocus search is for example performed from macro to infinity. This operation for example takes at least six steps, three for a coarse search followed by three for a fine search.

Figure 6:
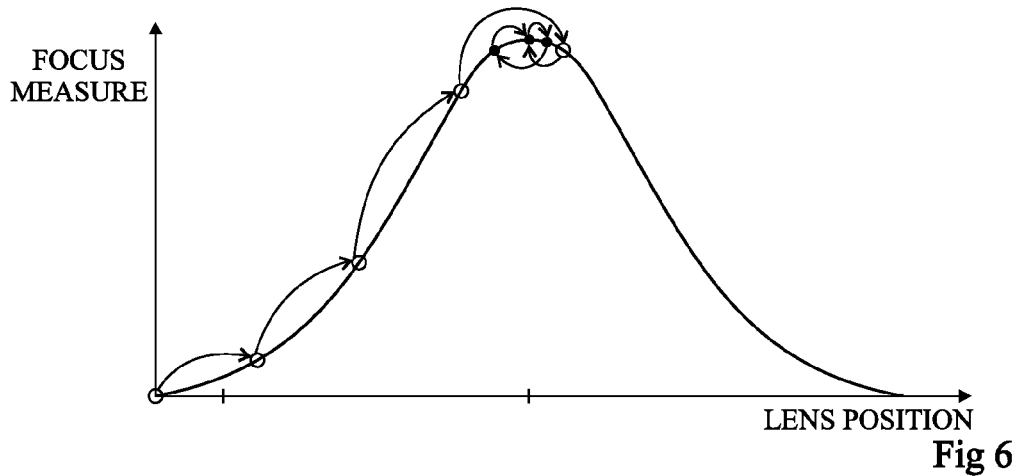
FIG. 6 is a graph illustrating an iterative ful autofocus search according to an embodiment of the present disclosure.

FIG. 6 is a graph illustrating an example of the full autofocus search performed in operation 511 of FIG. 5. A focus measure, which is for example based on a contrast detection technique applied to a captured image, is provided as an input. As illustrated, during a coarse search represented by hollow dots, the lens position is modified in relatively large increments towards the hyperfocal position until the focus measure starts to fall. A fine search is then performed as represented by solid dots, by moving the lens position by smaller increments.

In both the coarse and fine search phases, the hill climbing search (HCS) algorithm is for example applied. The HCS algorithm for example involves:

i) taking a first focus measure for a first lens position;
ii) move the lens by one lens increment in a first direction to a second position, where the increment is higher for the coarse search than for the fine search;
iii) taking a second focus measure for the second lens position; and either:
iv) if the second focus measure increased with respect to the first focus measure, moving the lens position again in the first direction, and repeating this step until the focus measurement decreases; or
v) if the second focus measure decreased with respect to the first focus measure, check on the other side of the first lens position, if any.

Figure 7:
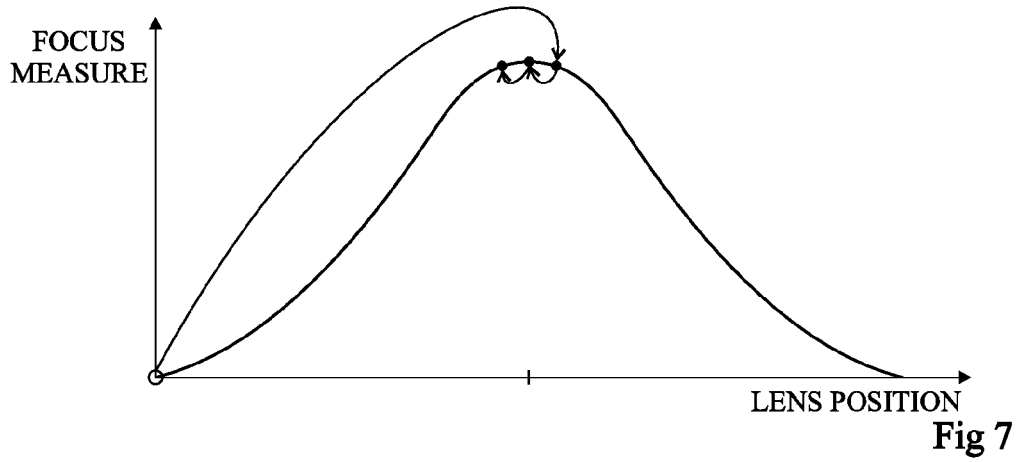
FIG. 7 is a graph illustrating an iterative fine autofocus search according to an embodiment of the present disclosure.

FIG. 7 is a graph illustrating an example of the fine autofocus search for example performed in step 510 of FIG. 5. As illustrated, initially the lens is for example taken to the infinity lens position, and then brought back until the focus measure starts to fall.

Thus it can be seen from FIGS. 6 and 7 that one or more steps in the autofocus search sequence can be economized by directly performing a fine autofocus search over a reduced range of lens positions, rather than performing a full autofocus search over the whole range.

In some embodiments, in addition to or rather than using the value of Dmax, the ranging device 108 is capable of generating error codes when a valid distance measurement cannot be generated. Such error codes can be used to reduce the number of steps of the iterative autofocus search sequence. By way of example, one or more of the following error types may be indicated by the ranging device 108 using appropriate error codes:

Error type: Raw ranging underflow. This type of error occurs when one or more internal registers in the ranging device are set to a negative value during the ranging operation. This is an error that generally results from the target being either very close to the ranging device, or from the target being particularly bright and being relatively far from the ranging device. These two cases can be differentiated based on the return signal rate. For example, if the return rate is low, the target is determined to be far, whereas if the return rate is high, the target is determined to be close. In the case of a close target, the lens position is for example taken to macro, in other words the lens position corresponding to the shortest focused distance. In the case of a far target, an autofocus search is for example performed between Dmax and infinity, or the hyperfocal position is used directly.

Error type: Raw ranging overflow. This means that the buffer of the ranging device 108 for storing the distance measurement has overflowed. Generally, this means that the ranging device 108 must be close to its maximum range, and thus a search can be started from Dmax.

Error type: low SNR, meaning that there is high ambient light compared to the signal. In view of the bright conditions, the likelihood is that the camera is outside, and thus the hyperfocal lens position is for example used. Alternatively, an autofocus search is performed from Dmax to infinity.

An advantage of the embodiments described herein is that the speed of the autofocus sequence can be increased by using parameters provided by a ranging device.

Having thus described at least one illustrative embodiment, various alterations, modifications and improvements will readily occur to those skilled in the art.

For example, while embodiments have been described in which the ranging device is based on photo detection, it will be apparent to those skilled in the art that the principles described herein could be equally applied to other types of ranging detectors.

The invention claimed is:

1. An autofocus method, comprising:
   determining by a processing device of a digital camera having a ranging device that the ranging device failed in an attempt to provide a distance estimation between the digital camera and an object;
   receiving by the processing device from the ranging device one or more parameters indicating conditions related to the failure of the ranging device to provide the distance estimation;
   determining, based on the one or more parameters, a subset of a whole autofocus search range, wherein the subset has a higher probability of including the object than a remainder of the autofocus search range; and
   performing by the processing device an autofocus sequence within the determined subset of the whole autofocus search range before performing a further autofocus sequence in the remainder of the autofocus search range.

2. The autofocus method of claim 1, wherein the one or more parameters comprise one or more of:
an error code from the ranging device; and
a distance value representing an estimation of a maximum distance for which the ranging device is capable of determining a distance estimation.

3. The autofocus method of claim 1, wherein the digital camera comprises at least one lens controllable to have N unique focusing positions, and wherein, based on the one or more parameters, the autofocus sequence comprises an iterative search covering a subset of the N unique focusing positions, an initial lens position of the autofocus sequence being selected based on the one or more parameters.

4. The autofocus method of claim 3, wherein the digital camera comprises an image sensor on which the at least one lens forms an image of an image scene, the method further comprising:
processing by the processing device of images captured by the image sensor to determine focus measures; and
performing the iterative autofocus search based on the focus measures.

5. The autofocus method of claim 3, wherein the one or more parameters comprise a distance value representing an estimation of a maximum distance (Dmax) for which the ranging device is capable of determining a distance estimation.

6. The autofocus method of claim 5, wherein the distance value is determined based on an ambient light measure.

7. The autofocus method of claim 6, further comprising estimating a reflectance of the object of the autofocus method, and determining the distance value based also on the estimated reflectance of the object.

8. The autofocus method of claim 7, wherein estimating the reflectance of the object comprises detecting a color of the object.

9. The autofocus method of claim 5, wherein processing comprises:
comparing the distance value with a first distance threshold; and
if the distance value is higher than the first distance threshold, performing the autofocus operation by selecting a lens position corresponding to infinity.

10. The autofocus method of claim 9, wherein the first distance threshold is a distance corresponding to less than one lens position from the infinity lens position.

11. The autofocus method of claim 5, wherein processing comprises:
comparing the distance value with a second distance threshold, and
if the distance value is higher than the second distance threshold, performing the autofocus operation by performing an iterative autofocus operation with fine steps for a range of lens positions corresponding to distances in a range from Dmax to infinity.

12. The autofocus method of claim 11, wherein the second distance threshold is equal to a focusing distance corresponding to six or less lens positions from the lens position corresponding to infinity.

13. An autofocus system, comprising:
a digital camera comprising at least one lens controllable to have N unique focusing positions;
a ranging device configured to estimate a distance to an object; and
a processing device configured to:
determine that the ranging device failed in an attempt to provide a distance estimation;
receive from the ranging device one or more parameters indicating conditions related to the failure of the ranging device to provide the distance estimation;
determine, based on the one or more parameters, a subset of a whole autofocus search range, wherein the subset has a higher probability of including the object than a remainder of the autofocus search range; and
perform an autofocus operation within the subset of the whole autofocus search range before performing a further autofocus operation in the remainder of the autofocus search range.

14. The autofocus system of claim 13, wherein the processing device is configured to perform the autofocus operation by performing an iterative search starting at a lens position selected based on the one or more parameters.

15. The autofocus system of claim 13, wherein the digital camera comprises an image sensor on which the at least one lens forms an image of an image scene, and wherein the processing device is configured to process images captured by the image sensor to determine focus measures and to perform the iterative autofocus search based on the focus measures.

16. The autofocus system of claim 13, further comprising a memory storing a table indicating a mapping between distances in the image scene and corresponding lens positions of the at least one lens for focusing at said distances.

17. The autofocus system of claim 13, wherein the one or more parameters comprise a distance value representing an estimation of a maximum distance for which the ranging device is capable of determining a distance estimation, and wherein the ranging device is configured to generate the distance value based on an ambient light measure.

18. An autofocus method, comprising:
determining by a processing device of a digital camera having a ranging device that the ranging device failed in an attempt to provide a distance estimation, wherein the digital camera comprises at least one lens controllable to have N unique focusing positions;
receiving by the processing device from the ranging device one or more parameters indicating conditions related to the failed attempt of the ranging device to provide the distance estimation; and
performing by the processing device an autofocus sequence based on the one or more parameters, wherein, based on the one or more parameters, the autofocus sequence comprises an iterative search covering a subset of the N unique focusing positions, with an initial lens position of the autofocus sequence being selected based on the one or more parameters, and
wherein the one or more parameters comprise a distance value representing an estimation of a maximum distance (Dmax) for which the ranging device is capable of determining a distance estimation; and
wherein performing by the processing device comprises:
comparing the distance value with a distance threshold, and
if the distance value is higher than the distance threshold, performing the autofocus operation by performing an iterative autofocus operation with fine steps for a range of lens positions corresponding to distances in a range from Dmax to infinity.

* * * * *